US012592758B1

(12) United States Patent
Couleaud et al.

(10) Patent No.: US 12,592,758 B1
(45) Date of Patent: Mar. 31, 2026

(54) SYSTEMS AND METHODS FOR WIRELESS SURVEILLANCE

(71) Applicant: Adeia Guides Inc., San Jose, CA (US)

(72) Inventors: Jean-Yves Couleaud, Mission Viejo, CA (US); Dhananjay Lal, Englewood, CO (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/901,199

(22) Filed: Sep. 30, 2024

(51) Int. Cl.
    *H04B 7/06*     (2006.01)
    *G01S 5/02*     (2010.01)
    *H04W 24/10*     (2009.01)
    *H04W 64/00*     (2009.01)

(52) U.S. Cl.
    CPC .......... H04B 7/0626 (2013.01); G01S 5/0284 (2013.01); H04W 24/10 (2013.01); H04W 64/003 (2013.01)

(58) Field of Classification Search
    CPC .... H04B 7/0626; G01S 5/0284; H04W 24/10; H04W 64/003
    USPC ................................................ 375/260, 262
    See application file for complete search history.

(56) References Cited

U.S. PATENT DOCUMENTS

2019/0223074 A1* 7/2019 Nammi ................ H04B 7/0689
2021/0176162 A1* 6/2021 Yadlapalli ............ H04L 45/033
2023/0261721 A1* 8/2023 Hong ................. H04B 7/06952
    370/329
2024/0183974 A1* 6/2024 Shrestha ................ G01S 13/75
2024/0337723 A1* 10/2024 Li ........................... G01S 7/006
2025/0133564 A1* 4/2025 Wang ................... H04B 7/0626

OTHER PUBLICATIONS

"National broadband map," Broadbandnow, available online at <https://broadbandnow.com/research/national-broadband-map>, retrieved on Dec. 10, 2024, 8 pages.
"WiFi Can do More (Trademark): Make Your Home Smarter, Safer, and more Secure with WiFi Sensing", Home—origin wireless, Retrieved on Dec. 10, 2024, pp. 1-8, Retrieved from https://www.originwirelessai.com.

(Continued)

*Primary Examiner* — Emmanuel Bayard
(74) *Attorney, Agent, or Firm* — HG LAW LLP

(57)          ABSTRACT

Systems and methods are provided for wireless surveillance. A wireless link is initiated between first and second wireless devices, and first channel state information (CSI) of the link is evaluated to determine relative locations of the devices. Evaluating the CSI comprises evaluating first and second directions of the wireless link between the first and second wireless devices via respective first and second time rate-of-change data. The first wireless device, the second wireless device, and the wireless link are selected based at least in part on the evaluating the CSI of the wireless link to perform a monitoring routine. The first and second wireless devices are controlled to perform the monitoring routine to determine a relative position and a movement of an object, which comprises evaluating third time rate-of-change data of the wireless link. An indication of the movement and relative position of the object is generated for output.

20 Claims, 13 Drawing Sheets

(56) References Cited

OTHER PUBLICATIONS

Behboodi, A. et al., "Bringing AI research to wireless communication and sensing [video]", Qualcomm, May 25, 2022, pp. 1-9, Retrieved from https://www.qualcomm.com/news/onq/2022/05/bringing-ai-research-to-wireless-communication-and-sensing.

Du, R. et al., "An Overview on IEEE 802.11bf: WLAN Sensing", arXiv:2207.04859v1, Jul. 11, 2022, pp. 1-23.

Kim, J. et al., "Structure from WiFi (SfW): RSSI-based Geometric Mapping of Indoor Environments", arXiv:2403.02235v1, Mar. 4, 2024, 6 pages.

Li, X. et al., ": Towards Collaborative and Cross-Domain Wi-Fi Sensing: a Case Study for Human Activity Recognition", in IEEE Transactions on Mobile Computing, vol. 23, No. 2, Feb. 2024, pp. 1674-1688.

Ma, Y. et al., "WiFi Sensing with Channel State Information: a Survey", ACM Comput. Surv., vol. 52, No. 3, Article 46, Jun. 2019, pp. 1-36.

Regani, S. D. e al., "Wifi-based robust indoor localization for daily activity monitoring", MWSSH '22: Proceedings of the 1st ACM Workshop on Mobile and Wireless Sensing for Smart Healthcare, Oct. 17, 2022, pp. 1-6.

Sen, S. et al., "Pricise indoor localization using PHY layer information", HotNets-X: Proceedings of the 10th ACM Workshop on Hot Topics in Networks, Article No. 18, Nov. 14, 2011, pp. 1-6.

* cited by examiner

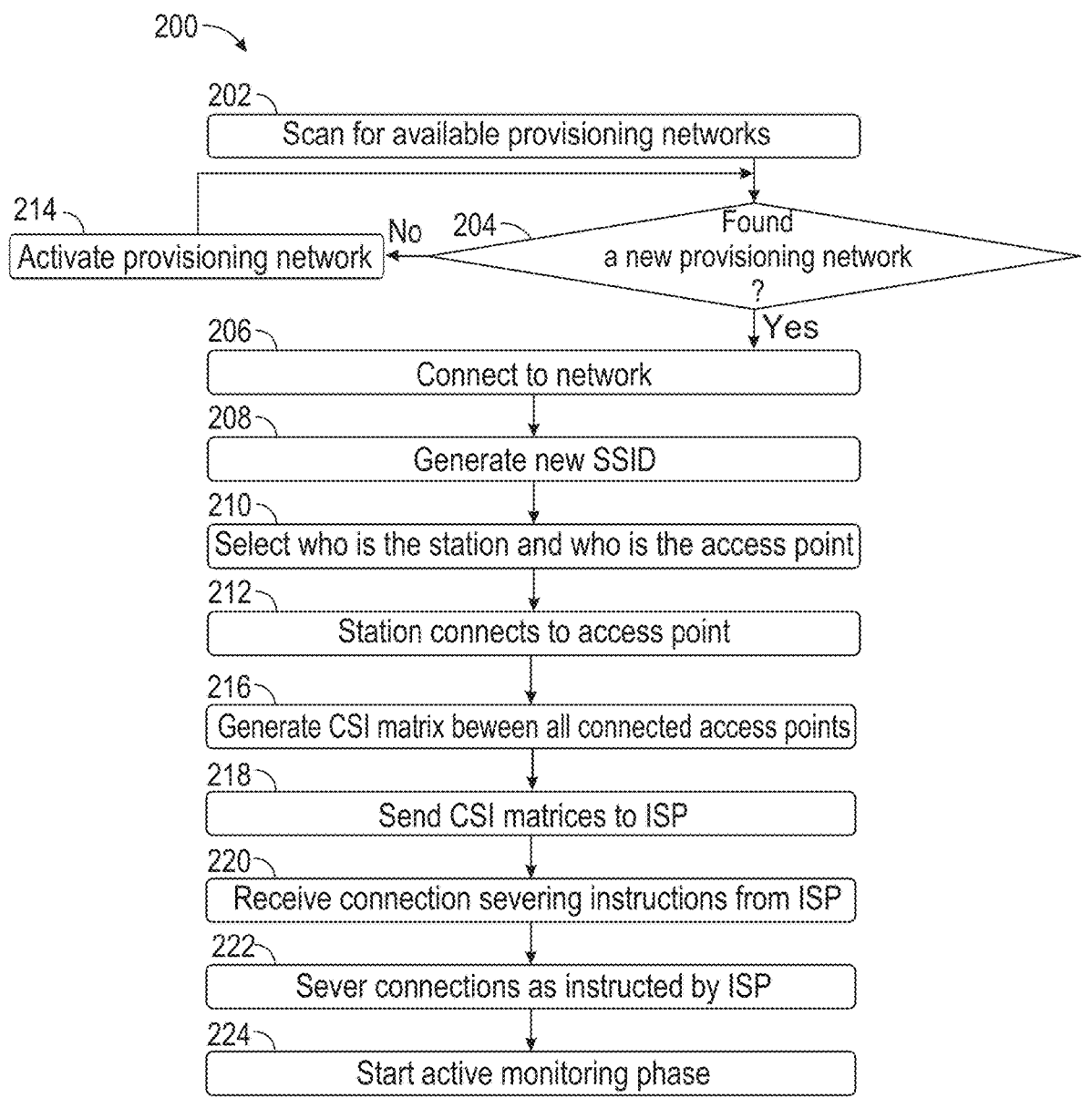

200

202 — Scan for available provisioning networks

214 — Activate provisioning network    No    204 — Found a new provisioning network ?

Yes

206 — Connect to network

208 — Generate new SSID

210 — Select who is the station and who is the access point

212 — Station connects to access point

216 — Generate CSI matrix beween all connected access points

218 — Send CSI matrices to ISP

220 — Receive connection severing instructions from ISP

222 — Sever connections as instructed by ISP

224 — Start active monitoring phase

FIG. 2

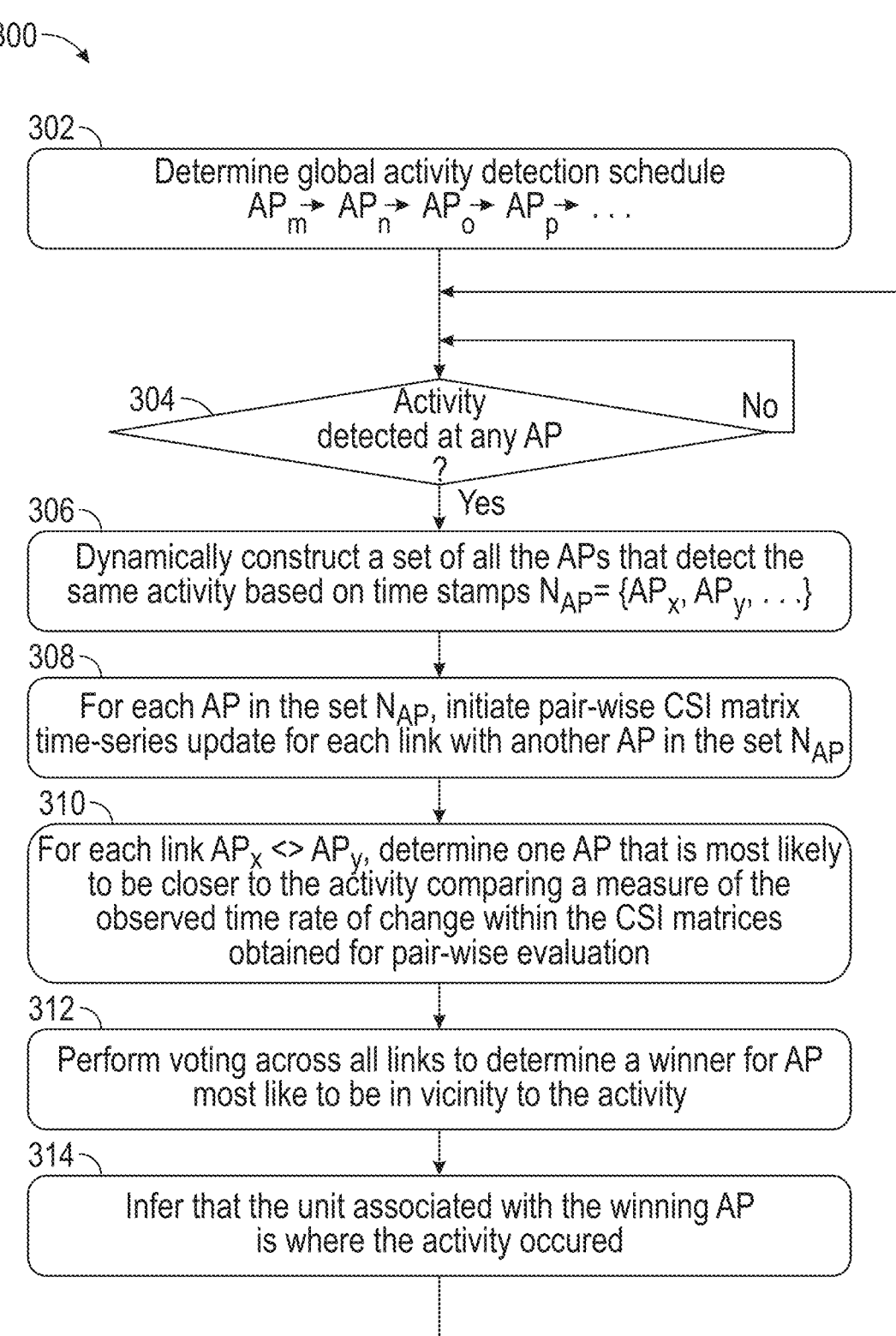

300

302
Determine global activity detection schedule
$AP_m \rightarrow AP_n \rightarrow AP_o \rightarrow AP_p \rightarrow$ . . .

304    Activity detected at any AP ?    No

Yes

306
Dynamically construct a set of all the APs that detect the same activity based on time stamps $N_{AP}= \{AP_x, AP_y, . . .\}$ 308
For each AP in the set $N_{AP}$, initiate pair-wise CSI matrix time-series update for each link with another AP in the set $N_{AP}$ 310
For each link $AP_x <> AP_y$, determine one AP that is most likely to be closer to the activity comparing a measure of the observed time rate of change within the CSI matrices obtained for pair-wise evaluation 312
Perform voting across all links to determine a winner for AP most like to be in vicinity to the activity 314
Infer that the unit associated with the winning AP is where the activity occured

FIG. 3

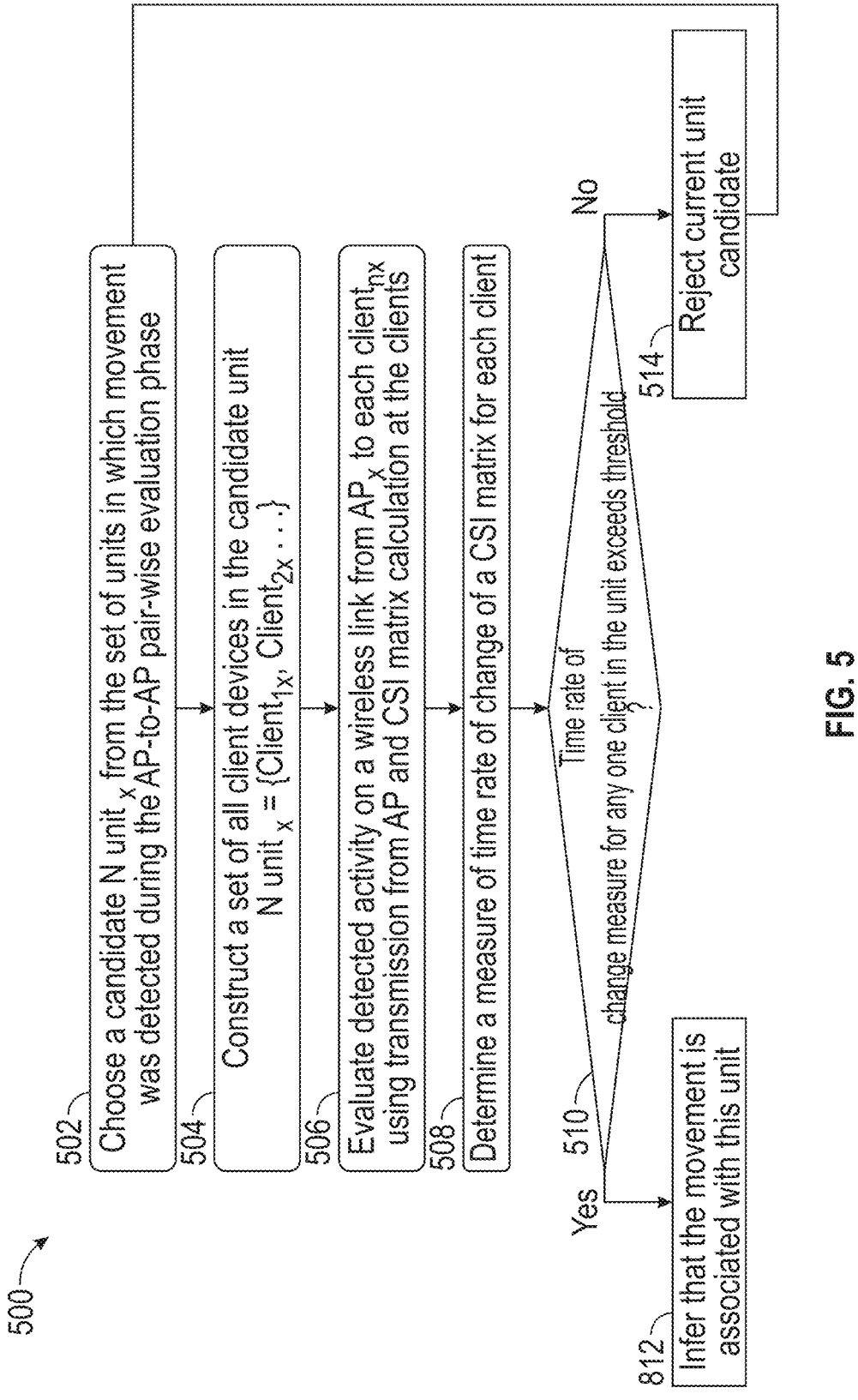

500

502 — Choose a candidate N unit$_x$ from the set of units in which movement was detected during the AP-to-AP pair-wise evaluation phase 504 — Construct a set of all client devices in the candidate unit
N unit$_x$ = {Client$_{1x}$, Client$_{2x}$ . . .}

506 — Evaluate detected activity on a wireless link from AP$_x$ to each client$_{nx}$ using transmission from AP and CSI matrix calculation at the clients 508 — Determine a measure of time rate of change of a CSI matrix for each client 510 — Time rate of change measure for any one client in the unit exceeds threshold?

No — 514 — Reject current unit candidate

Yes — 812 — Infer that the movement is associated with this unit

FIG. 5

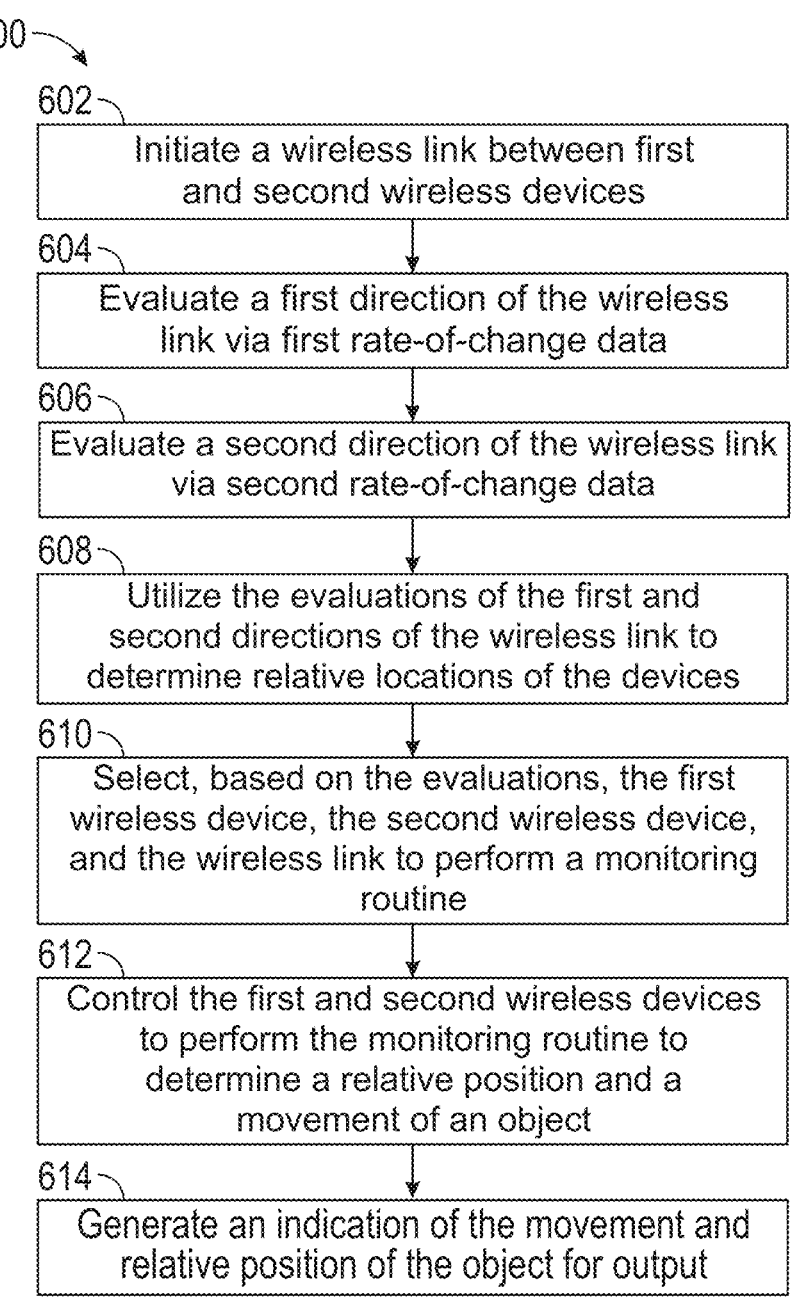

600

602
Initiate a wireless link between first
and second wireless devices

604
Evaluate a first direction of the wireless
link via first rate-of-change data 606
Evaluate a second direction of the wireless link
via second rate-of-change data 608
Utilize the evaluations of the first and
second directions of the wireless link to
determine relative locations of the devices 610
Select, based on the evaluations, the first
wireless device, the second wireless device,
and the wireless link to perform a monitoring
routine 612
Control the first and second wireless devices
to perform the monitoring routine to
determine a relative position and a
movement of an object 614
Generate an indication of the movement and
relative position of the object for output

FIG. 6

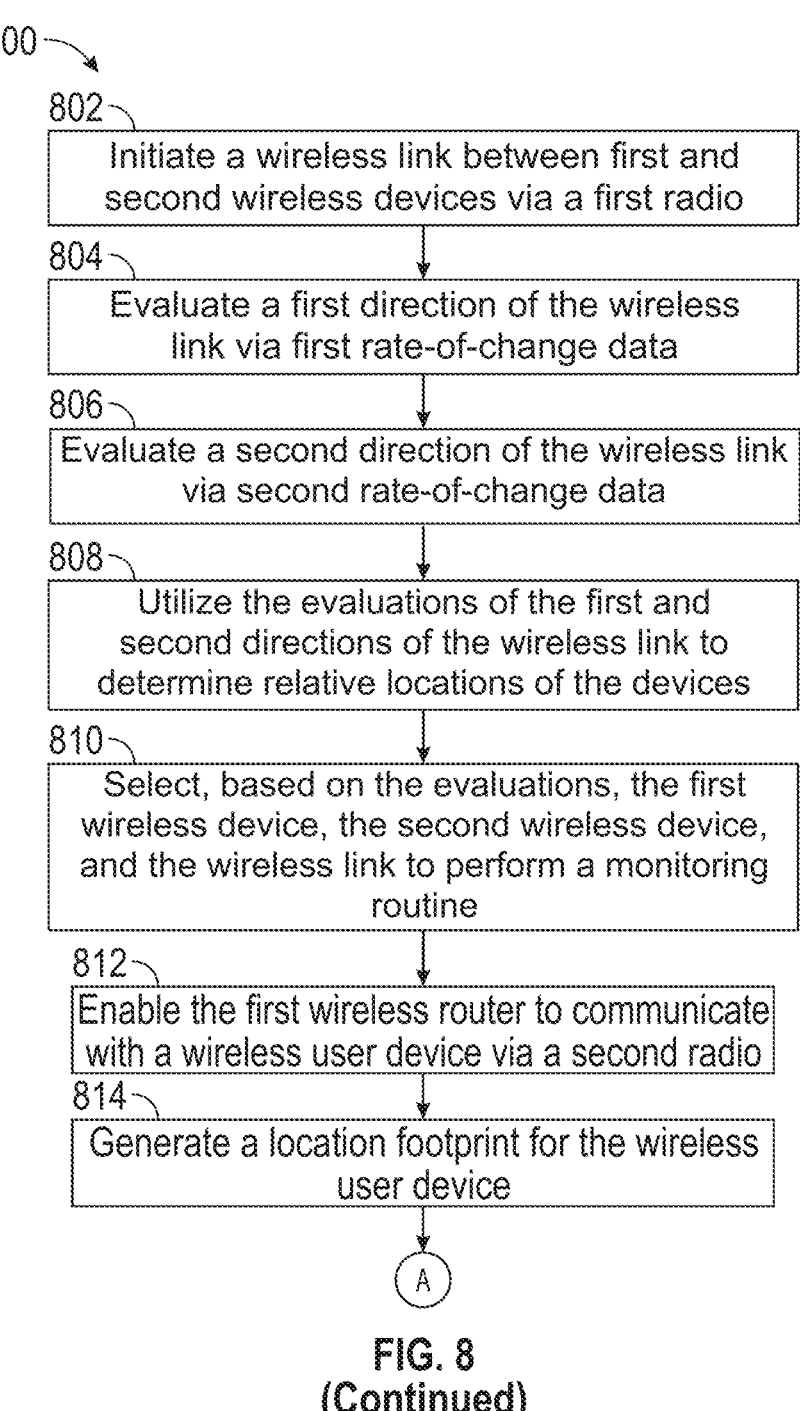

800

802
Initiate a wireless link between first and second wireless devices via a first radio 804
Evaluate a first direction of the wireless link via first rate-of-change data 806
Evaluate a second direction of the wireless link via second rate-of-change data 808
Utilize the evaluations of the first and second directions of the wireless link to determine relative locations of the devices 810
Select, based on the evaluations, the first wireless device, the second wireless device, and the wireless link to perform a monitoring routine 812
Enable the first wireless router to communicate with a wireless user device via a second radio 814
Generate a location footprint for the wireless user device

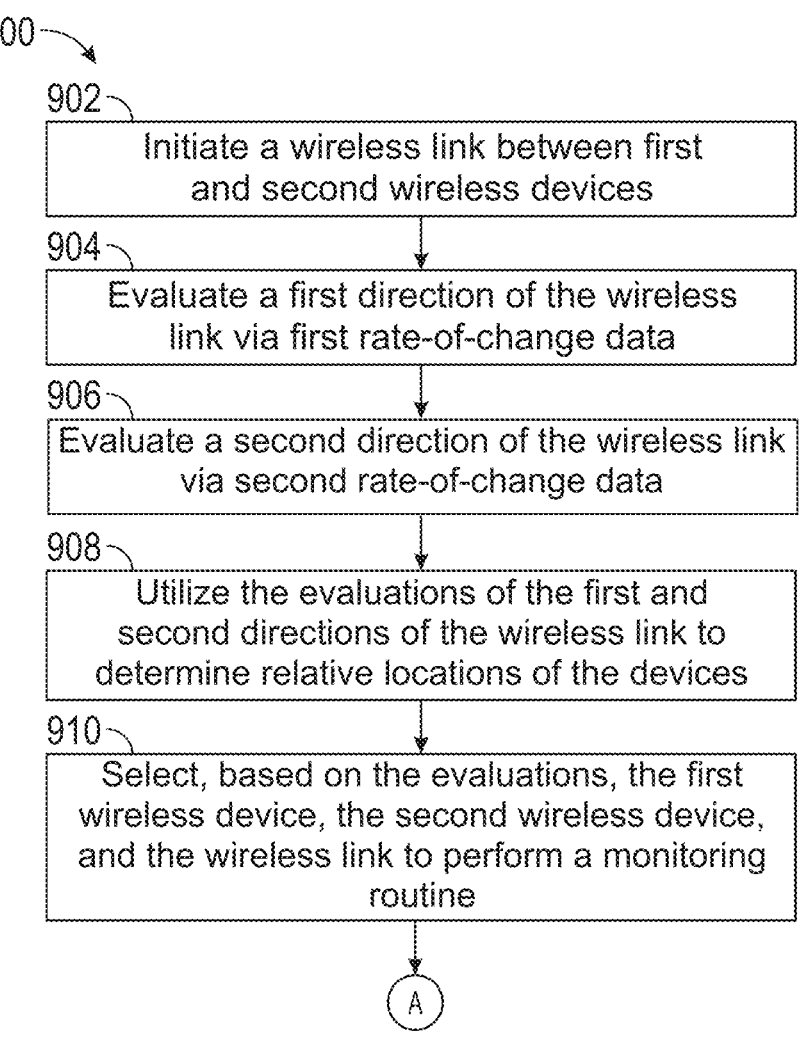

900

902
Initiate a wireless link between first and second wireless devices

904
Evaluate a first direction of the wireless link via first rate-of-change data 906
Evaluate a second direction of the wireless link via second rate-of-change data 908
Utilize the evaluations of the first and second directions of the wireless link to determine relative locations of the devices 910
Select, based on the evaluations, the first wireless device, the second wireless device, and the wireless link to perform a monitoring routine

SYSTEMS AND METHODS FOR WIRELESS SURVEILLANCE

One or more disclosed embodiments are directed towards systems and methods for enabling wireless surveillance, such as surveillance performed via one or more Wi-Fi networks. Some embodiments or aspects relate to additional or alternative features, functionalities, and/or fields.

SUMMARY

Home security systems are used to detect human intrusions, or presence, and these security systems may able to distinguish between normal in-premises activities, such as pets walking around, robot vacuum cleaners turning on, and/or other non-human motion. Typically, these home security systems may utilize sensors, such as motion sensors, glass break sensors and/or cameras; however, these systems require their own installation, maintenance and upkeep. In order to reduce, or remove, the cost and time of installing, maintaining and upkeeping typical home security systems, home security systems may utilize passive sensing;

Many modern computing devices utilize radio waves to send and receive data. In particular, Wi-Fi-enabled computing devices such as Wi-Fi routers and Wi-Fi-enabled smartphones and smart televisions are widespread, and there is a reasonable expectation that the vast majority of households have at least one Wi-Fi-enabled computing device present in them. Objects, including people, can have an impact on how radio waves travel from a transmitter and are detected by a receiver. In particular, moving objects can impact radio waves in a detectable manner, such that a change in a received signal strength indicator (RSSI) at a receiver can be detected, and it may be inferred that a change in the RSSI is due to a moving object, for example, a person walking around in a room. In some examples, post processing may be applied in order to better determine whether a change in the RSSI is due to a moving object or due to environmental variations; however, the RSSI may vary due to, for example, multi-path effect and changes to gain control of a receiver. These other causes of RSSI variation make a change in RSSI a relatively coarse indication of whether a change in RSSI is due to an object is moving.

An example of a home security system using passive sensing is one that utilizes existing Wi-Fi access points (APs), and detects, for example, human intrusions via changes in the Wi-Fi signal. Wi-Fi sensing that utilizes multiple APs may be known as passive sensing, as there is no specific transmission emanating from a localized activity region. Passive sensing in this manner has some drawbacks in that it generally provides relatively coarse location information. Deploying a home security system that utilizes existing Wi-Fi APs in, for example, single family units that are spaced far apart may be relatively straightforward as the relatively coarse location information may suffice; however, it is more challenging to deploy such as system in multi-dwelling units (MDUs). This can be due to the challenge in associating a specific detected activity with a specific MDU unit. In order to address this challenge, a detailed Wi-Fi survey may be performed to profile computing devices that a present, for example, each time a new user an MDU; however, this is time consuming process, and in order to provide relatively fine-grained localization via passive sensing, relatively large amounts of hardware, complex infrastructure, calibration efforts, and user cooperation are required.

Wi-Fi chipsets can be used to determine channel state information (CSI) of a wireless link, which is the channel property of the wireless link. The CSI represents the channel frequency response for each subcarrier between a transmitting computing device and a receiving computing device (in some examples, transmitting and receiving APs). The channel frequency response describes a fading factor of the signal on each transmission path. The CSI may be represented by a CSI matrix, which is typically calculated by the receiving computing device. A CSI matrix may be constructed in three dimensions, a first dimension for the number of transmitter antennas, a second dimension for the number of receiver antennas, and a third dimensions for the number of subcarriers. The CSI may be utilized for indoor localization, and using CSI in this manner typically incurs negligible additional costs, as it can reuse the existing Wi-Fi infrastructure. Wi-Fi-based localization approaches that utilize CSI typically rely on dedicated deployment and calibration in order to infer, for example, geometric relationships, which requires a relatively high setup effort. Other approaches that, for example, utilize CSI fingerprinting tend to require a relatively large amount of training, and cannot necessarily be generalized to different environments.

An improved home security system having improved coverage and discrimination of human presence and movement may be achieved if a large subset of all Wi-Fi equipment installed in a premises, such as an MDU building or complex, could collaborate with each other to measure multiple links, such as Wi-Fi links, simultaneously in order to ascertain changes in, for example, CSI of those wireless links due to moving objects (including people).

To help address these problems, systems and methods are provided for enabling wireless surveillance, such as surveillance performed via one or more Wi-Fi networks.

In accordance with a first aspect of the disclosure, a method is provided that includes initiating a wireless link between a first wireless device and a second wireless device, and evaluating channel state information (CSI) of the wireless link to determine relative locations of the first wireless device and the second wireless device. Evaluating the CSI comprises evaluating a first direction of the wireless link between the first wireless device and the second wireless devices via first time rate-of-change data for the first direction, and evaluating a second direction of the wireless link between the first wireless device and the second wireless device via second time rate-of-change data for the second direction. The first wireless device, the second wireless device, and the wireless link are selected, based at least in part on the evaluating the CSI of the wireless link, to perform a monitoring routine. The first wireless device and the second wireless device are controlled to perform the monitoring routine to determine a relative position and a movement of an object, where performing the monitoring routine comprises evaluating third time rate-of-change data of the wireless link. An indication of the movement and relative position of the object is generated for output.

In an example system, a first wireless router detects a second wireless router via, for example, a service set identifier (SSID) associated with the second wireless router, and, on detecting the second wireless router, a wireless link is initiated between the first and second wireless routers. CSI of the wireless link between the first and second wireless routers is used to generate relative locations or mapping information of the first and second wireless routers. When an object, such as a person, moves through or otherwise disrupts the wireless link, the CSI of the wireless link may change. In order to detect the movement of an object, or person, the CSI of the wireless link is monitored or evaluated. Rate-of-change data of the wireless link, for example, rate-of-change data of a first CSI matrix of the wireless link, is used to determine movement of an object, for example, a person walking into a room.

In an example, to determine the relative position of the object, the wireless link between the first wireless device and the second wireless device in a first direction is evaluated via an estimation of a measure in second time rate-of-change data for the first direction, and the wireless link between the first wireless device and the second wireless device in a second direction is evaluated via an estimation of a measure in third time rate-of-change data for the second direction. An indication of the movement and relative position of the object is generated for output. For example, a notification may be transmitted from the first or second wireless router via a network, such as the internet to an internet service provider (ISP). The ISP may then notify a user via, for example, an alert generated at an application associated with the ISP running on a smartphone. In another example, a text notification may be transmitted to a law enforcement agency and/or a private security company. In this manner, wireless surveillance, such as surveillance performed via one or more Wi-Fi networks, is enabled.

BRIEF DESCRIPTIONS OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and shall not be considered limiting of the breadth, scope, or applicability of these concepts. It should be noted that for clarity and ease of illustration these drawings are not necessarily made to scale.

The above and other objects and advantages of the disclosure may be apparent upon consideration of the following detailed description, taken in conjunction with the accompanying drawings, in which:

FIG. 2 is a flowchart of illustrative steps involved in enabling surveillance via one or more Wi-Fi networks, in accordance with some embodiments of the disclosure;

FIG. 3 is another flowchart of illustrative steps involved in enabling surveillance via one or more Wi-Fi networks, in accordance with some embodiments of the disclosure;

FIG. 5 is another flowchart of illustrative steps involved in enabling surveillance via one or more Wi-Fi networks, in accordance with some embodiments of the disclosure;

FIG. 6 is another flowchart of illustrative steps involved in enabling surveillance via one or more Wi-Fi networks, in accordance with some embodiments of the disclosure;

DETAILED DESCRIPTION

Figure 1:
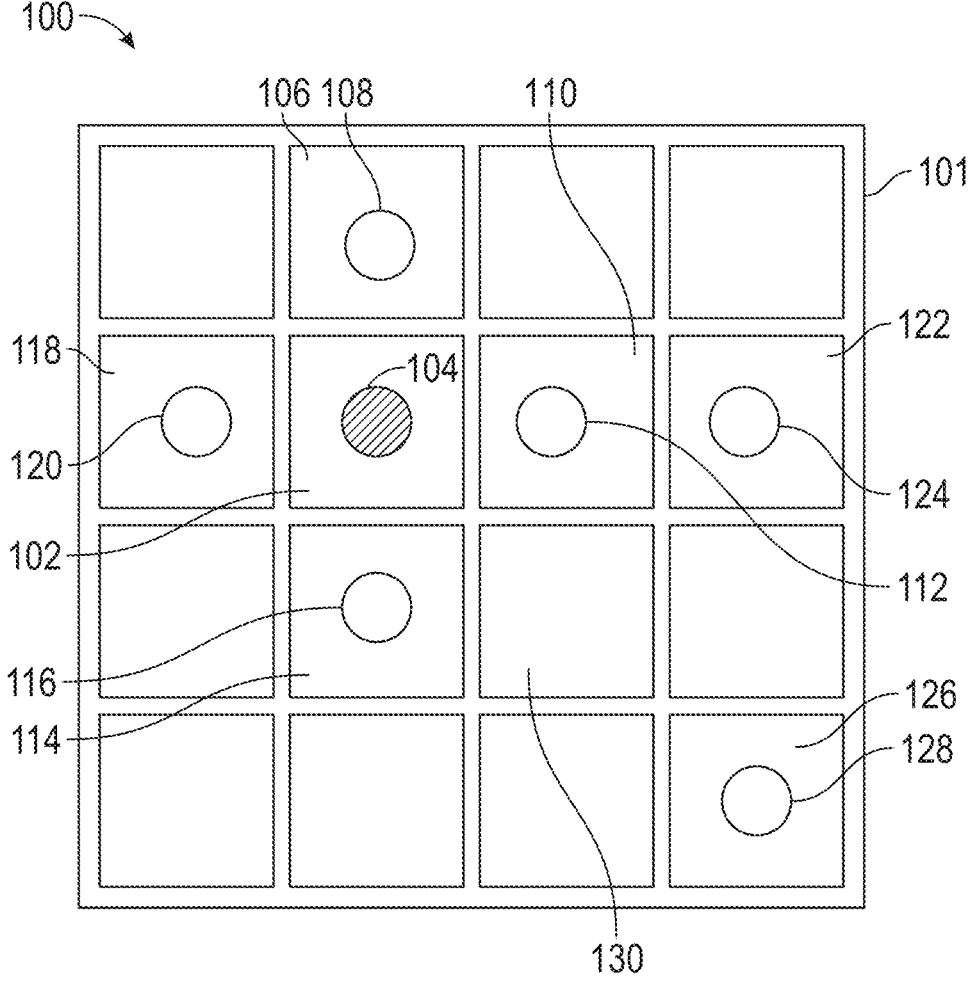
FIG. 1 shows an example environment for enabling surveillance via one or more Wi-Fi networks, in accordance with some embodiments of the disclosure.

A wireless computing device is a computing device that can connect to a network in a wireless manner, such as via Wi-Fi.

CSI is the known channel properties of a wireless link. The CSI describes how the wireless signal propagates from a transmitter to a receiver and represents the combined effect of channel perturbations. These channel perturbations may include, for example, perturbations due to signal fading, power decay and/or scattering. Typically, CSI is estimated at a receiver and is fed back to the transmitter; however, reverse-link estimation also enables CSI to be estimated at a transmitter. In some examples, a transmitter and a receiver may have different CSI. As the conditions of a wireless link may vary, the transmitter and/or receiver may estimate an instantaneous CSI based on known data.

A notification may include any response to detecting the presence and/or movement of an object, including a person. A notification may be transmitted from a wireless service to, for example, a security provider, including an ISP running a security service. The security provider may notify a user via, for example, an alert generated at an application associated with the security provider running on a smartphone. In another example, a notification may be transmitted to a law enforcement agency and/or a private security company. In some examples, this notification may be a text notification. A notification may include generating a visual indication of the presence and/or movement of an object, for example, causing a light to flash. In another example, a notification may additionally, or alternatively, include generating an audible notification of the presence and/or movement of an object, for example, causing an alarm to sound. The visual and/or audible notification may be output at a local device and/or a remote device to the premises at which the detection occurs.

The disclosed methods and systems may be implemented on one or more devices, such as user or client devices, servers, network management or other network devices, and/or other computing devices. As referred to herein, the device can be any device comprising a processor and memory, for example, a handheld computer, a mobile telephone, a portable video player, a portable music player, a portable gaming machine, a smartphone, a smartwatch, a smart speaker, an augmented reality headset, a mixed reality device, a virtual reality device, a gaming console, a vehicle infotainment headend or any other computing equipment, a wireless device, a modem, a router, and/or combination of the same. Typically, a computing device will also comprise a network interface.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory, including, but not limited to, volatile and non-volatile computer memory or storage devices such as a hard disk, USB drive, DVD, CD, media cards, register memory, processor caches, random access memory (RAM) and/or a solid-state drive.

In some examples, one or more wireless computing devices may be configured to enable surveillance via one or more Wi-Fi networks. A service provider, such as a security service provider and/or an ISP may configure a first wireless computing device, such as a Wi-Fi router, to scan for a provisioning network SSID upon an installation and during a setup process. In some examples, the first wireless computing device may be configured before it is delivered to a premises, such as a customer home. In other examples, an ISP may deliver multiple wireless routers to different customers who are neighbors and/or who are each occupant in a multi-dwelling unit, such as a block of apartments. Each of these multiple wireless routers may broadcast a provisioning network that has a unique, or shared, network SSID. The first computing device may then connect to each of the provisioning network SSIDs it detects in a sequence, and it may collaborate with one or more other computing devices, such as a second wireless router, on that provisioning network SSID in order to establish a new pairing network over a new unique SSID. At the end of the pairing process, the first computing device may have established one or more independent links with a respective one or more other computing devices, each over independent SSIDs, or a common SSID, that it has detected in its vicinity. Based on a CSI matrix of each of these independent links, a physical map of the location of the first computing device in relation to the one or more other computing devices may be generated. In this manner, a monitoring network may be formed. This monitoring network may be utilized to detect the movement of objects, including people, within a building. In some examples, the map may be generated by an ISP upon receiving the CSI matrices from the first computing device and/or any of the one or more other computing devices. That map, such as an interdependence map, may be extended and turned into an actual physical map of the area covered by a Wi-Fi network of the first computing device in, for example, two or three dimensions. An example of such a two-dimensional map is discussed in connection with FIG. 1 below.

FIG. 1 shows an example environment for enabling surveillance via one or more Wi-Fi networks, in accordance with some embodiments of the disclosure. The environment 100 depicts a building 101 comprising a plurality of units that each comprise one or more rooms, and a plurality of wireless computing devices 104, 108, 112, 116, 120, 124, 128, such as wireless routers. In some examples, the building 101 may comprise a plurality of individual units. In this example, a first unit 102 contains a first wireless computing device 104, a second unit 106 contains a second wireless computing device 108, a third unit 110 contains a third wireless computing device 112, a fourth unit 114 contains a fourth wireless computing device 116, a fifth unit 118 contains a fifth wireless computing device 120, a sixth unit 122 contains a sixth wireless computing device 124 and a seventh unit 126 contains a seventh wireless computing device 128. The first computing device 104 may have one or more wireless links with each of the second to seventh computing devices 108, 112, 116, 120, 124, 128 in order to form a monitoring network for monitoring the movement of objects, including people, in unit 102.

In one example, based on generated mapping information, a service provider, such as the ISP, may transmit instructions to the first wireless computing device 104 to sever connections with one or more of the other wireless computing devices 108, 112, 116, 120, 124, 128. For example, in the configuration depicted in FIG. 1, the first wireless computing device 104 in unit 102 may have established connections with each of the other wireless computing devices 108, 112, 116, 120, 124, 128. In this example, based on the generated map, the service provider may determine that a link between the first computing device 104 and the sixth computing device 124 is redundant in light of the link between the first computing device 104 and the third computing device 112, because the third and sixth computing devices 112, 124 are in the same plane, and hence overlap to a degree, but with the sixth computing device 124 being farther away from the first computing device 104 than the third computing device 112. This may be determined via, for example, CSI information of the wireless links between the first and third computing devices 104, 112, and the first and sixth computing devices 104, 124. On determining that the link between the first computing device 104 and the sixth computing device 124 is redundant, that link may be terminated or otherwise omitted from a monitoring network for unit 102. In some other examples, this redundant link may be retained, as the link may yield relevant information. Despite overlapping, each computing device-to-computing device link may describe a multi-path fading environment, and provide data relevant to activity inside of that multi-path fading environment.

In another example, the first computing device 104 may be located in a first apartment, and the seventh computing device 128 may be located in a second apartment, and the service provider may determine that a link between the first computing device 104 and the seventh computing device 128 crosses from the first apartment to the second apartment. This determination may be based on, for example, comparing the generated map to an existing map, blueprint and/or floorplan of the building 101. In some examples, this existing map may be accessed from a remote server via a network, such as the internet. In this example, a false alarm may be generated when attempting to monitor activity in the first apartment due to the link crossing into another apartment. In order to prevent false alarms, the service provider may transmit an instruction to the first computing device 104 to terminate the link with the seventh computing device 128.

As described above, at least two of the computing devices 104, 108, 112, 116, 120, 124, 128 may partake in a provisioning process. Upon performance or completion of the provisioning process, the first computing device 104 may then also create and activate a provisioning SSID so that any new computing device may then connect to it as part of their provisioning process. If, during the provisioning process, the first computing device 104 does not detect a provisioning network, it may create a provisioning network.

In some examples, a service provider, such as an ISP, may provide computing devices, such as routers, with two radios. One of the radios may be configured (e.g., via firmware and/or programming instructions stored on the computing device) for establishing managed connections between computing devices. An advantage of utilizing two radios is that one radio may be used to provide, for example, Wi-Fi access to the internet, and the second radio may be used for a provisioning network. This may reduce, or substantially negate, any performance penalty associated with simultaneously providing, for example, Wi-Fi access to the internet and a provisioning network. For example, a router may be fitted with two 5 GHz radios and one 6 GHz radio, with one of the two 5 GHz radios configured for inter-router communication, allowing a user to still connect devices via, for example, an 802.11 a/n/ac/ax link.

Once the provisioning phase has ended, the first computing device, such as a router, may then switch to an active measurement phase in which it regularly sends and receives data via a wireless link to any local computing devices, such as other routers, in order to establish a set of CSI matrices. The first computing device may then process the CSI matrices, either locally or by sending any CSI measurements to a remote server. In some examples, a service provider, such as an ISP, may control or operate the remote server. The CSI measurements may be utilized to generate information pertaining to the presence and movement of objects, including, for example, people, in the unit 102 associated with the first computing device 104.

FIG. 2 is a flowchart of illustrative steps involved in enabling surveillance via one or more Wi-Fi networks, in accordance with some embodiments of the disclosure. The process 200 may be utilized, for example, to determine initial computing device associations for a monitoring network. Process 200 may be implemented, in whole or in part, on any of the aforementioned computing devices. In addition, one or more actions of the process 200 may be incorporated into or combined with one or more actions of any other processes or embodiments described herein.

At 202, a first computing device scans for available provisioning networks, and at 204, it is determined whether a new provisioning network is present. If, at step 204, it is determined that there is no new provisioning network, the process proceeds to step 214. If, at step 204, it is determined that there is a new provisioning network that is transmitted from a second computing device, the process proceeds to step 206, where the first computing device connects to the found provisioning network. At step 208, a new network SSID is generated. In some examples, this new network SSID is generated so that a dedicated network is created for that access point (AP), and its other AP. Over the provisioning network, which may be common for all devices, these APs may decide a new name for their own network, and connect to it for CSI evaluation. At step 210, it is determined which computing device is the station and which computing device is the AP. At step 212, the station computing device connects to the AP computing device via a wireless link. In some examples, the computing device may connect to the AP computing device via the newly created SSID.

At step 214, the provisioning network is activated, and at step 216, a CSI matrix, or CSI matrices, of the one or more links between all connected APs is generated. At step 218, the CSI matrices are transmitted to a service provider, such as an ISP. At step 220, an instruction from the ISP is received, instructing that a wireless link between computing devices is to be severed. At step 222, the wireless link is severed according to the received instruction, and at step 224, an active monitoring phase or routine is initiated.

In some examples, as more computing devices, such as routers, are added and/or removed from the monitoring network, the service provider, such as an ISP, may instruct selected computing devices to terminate one or more wireless links with other computing devices, such as other routers, in order to optimize the monitoring coverage, or to create new connections with other computing devices. In the example shown in FIG. 1, the service provider may detect at a point in time that a computing device has been added in unit 130, and this computing device may be added to the group of computing devices that are utilized to monitor unit 102.

If, for example, prior to the installation of a computing devices in unit 130, a connection was established between the third computing device 112 and the seventh computing device 128 to monitor unit 130, then this connection may be terminated, and a new connection may be initiated between the new computing device in unit 130 and the first, third, fourth, sixth and seventh computing devices 104, 112, 116, 124, 128, to monitor activity in unit 130.

In another example, a service provider, such as an ISP, may provide monitoring services, such as a home monitoring service, to a subscriber who does not have an internet service with that service provider. This monitoring service may be enabled by selecting a set of computing devices, such as routers, installed in the surrounding area (for example, in apartments and/or townhomes) of the dwelling of that subscriber and commanding those computing devices to establish links that go through the dwelling. For example, if computing device 104 were not present in unit 102, then unit 102 may be monitored for object movement, including people, if the service provider transmits instructions to the second and fourth computing devices 108, 116 and the third and fifth computing devices 112, 120 to establish respective links.

In some examples, a service provider, such as an ISP, may trigger a provisioning process remotely. For example, a set of computing devices, such as routers, may run a firmware that does not support CSI data collection and/or analysis; however, the service provider may transmit a firmware update to these computing devices that enables, for example, CSI data collection and/or analysis. In this example, the service provider may then trigger a provisioning phase for each of these computing devices in a sequential manner in order to enable CSI data collection and/or analysis, thereby enabling a monitoring network to be established. In some examples, the provisioning phase may be initiated every time that a computing device is restarted in order to account for a scenario where a computing device is moved from a first location to a second location, which may require the re-evaluation of the relative position of that computing device with the others in the monitoring network. In some examples, the provisioning phase may be initiated on detection of movement of the computing device. Movement of the computing device may be inferred from CSI data and/or via data generated from a computing device component, such as an accelerometer, location data, such as global positioning data and/or gyroscopic data.

FIG. 3 is another flowchart of illustrative steps involved in enabling surveillance via one or more Wi-Fi networks, in accordance with some embodiments of the disclosure. Process 300 may be implemented, in whole or in part, on any of the aforementioned computing devices. In addition, one or more actions of the process 300 may be incorporated into or combined with one or more actions of any other processes or embodiments described herein.

At 302, a global activity detection schedule is determined for a plurality of computing devices, such as a plurality of APs in a building, $AP_m \rightarrow AP_n \rightarrow AP_0 \rightarrow AP_p \rightarrow \ldots$ This global activity detection schedule may, for example, be initiated by a network administrator of the building, and/or it may be derived from any number and/or identity preprogrammed into an AP. For example, a hash function may be calculated on the MAC address of each AP, and nodes in the schedule may be ordered (in ascending or descending order) based on this calculated hash function. The nodes may also calculate the order in a distributed manner, for example, by exchanging the hash function derivatives of their MAC addresses. In another example, one AP may be chosen as a schedule coordinator, and that AP may calculate and communicate a schedule to all of the other nodes.

In some examples, once the global schedule is calculated and communicated, each AP may transmit a known sequence in its turn. This known sequence is captured at each of the other APs, and each AP calculates a CSI matrix from the receiving of this known sequence. Each receiving AP may monitor its local vicinity for activity in this manner. The received CSI over frequency f at time t may be decomposed into a static part, and a dynamic part, as:

$$H(t, f) = H_s(t, f) + \sum_{i \in \Omega_d(t)} H_i(t, f)$$

The static part is contributed by, for example, reflections from the stationary objects, and the dynamic part is contributed by, for example, the set of moving scatterers $\Omega_d$ (t). In some examples, different features may be extracted from the power response derived from the unprocessed CSI. These include identification of activities such as high motion and/or breathing patterns, as well as coarse localization. Calculating the time rate of change of CSI enables each receiving AP to determine whether activity is present in the multi-path fading environment between the transmitting AP and the receiving AP. For example, chest movement caused by human breathing patterns may introduce periodic changes in Wi-Fi multipath signal propagation that can be detected via the CSI.

At 304, it is determined whether any activity is detected at an AP. If, at step 304, no activity is determined, then the process enters a loop until activity is detected. If, at step 304, activity is detected, then the process proceeds to step 306. At step 306, a set of all of the APs that detect the same activity is dynamically constructed based on time stamps, $N_{AP} = \{AP_x, AP_y, \ldots\}$.

When activity is detected by one or more of the receiving APs in response to a transmission, then a set of all APs that detected the same activity is constructed. The set may be, for example, constructed by the transmitting AP based on CSI data received from the receiving APs. Each of the APs within this set may be informed of all the nodes that lie in this set of APs.

At step 308, for each AP in the set of APs, a pair-wise CSI matrix time series updated for each link with another AP in the set of APs is initiated. Each of the nodes that detected the activity in step 304 begins a pair-wise RF evaluation for activity detection with each of the other nodes in set of APs. In this pair-wise evaluation, a link between two APs is measured in both directions, with each of the APs, in turn, being a transmitter and a receiver of a known sequence.

At step 310, for each link $AP_x < > AP_y$, an AP that is the most likely to be closer to the activity is determined by comparing a measure of an observed time rate of change with the CSI matrices obtained for the pair-wise evaluation. In this step, one AP is determined for each link that is more likely to be in closer proximity of the activity. This is performed by estimating an appropriate measure in the time-series data of each of the CSI matrices (one for channel activity evaluation in each direction) and deciding, based on this measure, which of the receiving APs detected the greatest activity (e.g., which receiving AP had a CSI matrix with a higher time-rate-of-change as estimated by the measure).

To calculate a measure of time-rate-of-change, initially a portion of a CSI matrix is determined that affects the specific subcarriers (a radio resource) used during a transmission. A standard deviation a for each of the elements of the matrix across the time series may be calculated. Each value of standard deviation may be calculated across the time series data of the same element in the CSI matrix.

A four-dimensional CSI matrix of measured CSI signals over a subcarrier domain (1D), spatial domain (2D, RX, TX) and time domain (1D) may be formed.

$$\sigma_{ijkl} = \sqrt{\frac{(x_{ijkl,t1} - \mu)^2 + (x_{ijkl,t2} - \mu)^2 + (x_{ijkl,t3} - \mu)^2 + \cdots + (x_{ijkl,tN3} - \mu)^2}{N}}$$

$\sigma_{ijkl}$ is the standard deviation of an element in that four-dimensional matrix, calculated across time series data $x_{ijkl,t1}$, $x_{ijkl,t2} \cdots x_{ijkl,tN}$. Here $x_{ijkl,tN}$ is an element at position ijkl in the 4D matrix at time t=N, while $\mu$ is the mean of matrix element $x_{ijkl}$ across the time series ranging from t1 to tN during which the activity is detected.

A mean value of all the standard deviation values in the matrix region of interest (affected by Tx/Rx) is calculated. In the pair-wise evaluation, the receiver that has the higher mean value calculated from all the standard deviations is deemed to better perceive any activity, such as human activity.

At step 312, voting is performed across all links to determine a winner for an AP that is most likely to be in the vicinity of the activity, and, at step 314, it is inferred that the unit associated with the winning AP is where the activity occurred, and then the process loops back around to step 304. After one AP winner is chosen for each link between two nodes that lie in the set of APs, voting is performed to determine if a clear winner across all the links emerges. This clear winner after the voting stage is then inferred to be associated with the unit, such as a multiple dwelling unit, in which the activity occurred.

TABLE 1

| Example voting for a winning AP | |
| --- | --- |
| Link | Winner |
| $AP_1$-$AP_2$ | $AP_1$ |
| $AP_1$-$AP_3$ | $AP_1$ |
| $AP_1$-$AP_4$ | $AP_1$ |
| $AP_2$-$AP_3$ | $AP_3$ |
| $AP_2$-$AP_4$ | $AP_4$ |
| $AP_3$-$AP_4$ | $AP_3$ |

Table 1 illustrates an example wherein a winner is determined by voting from among four APs, $AP_1$, $AP_2$, $AP_3$ and $AP_4$. For n nodes in a set of APs, the total number of links are given by $n_{c_2}$. Thus, for four APs, a total of six links are shown in Table 1. For each link, a winner is declared based on, for example, the measure that estimates time-rate-of-change of the relevant portion of the CSI matrix. As seen from Table 1, the chosen winner is $AP_1$ as it received 3 votes.

Figure 4:
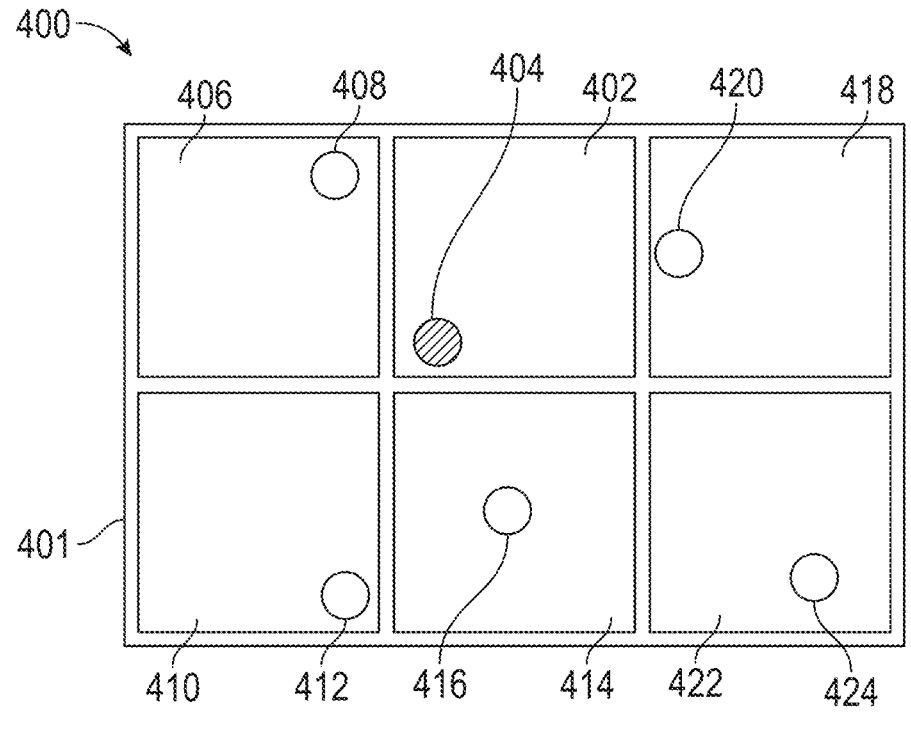
FIG. 4 shows another example environment for enabling surveillance via one or more Wi-Fi networks, in accordance with some embodiments of the disclosure.

FIG. 4 shows another example environment for enabling surveillance via one or more Wi-Fi networks, in accordance with some embodiments of the disclosure. In this example, a computing device, such as an AP, is placed in a location within a unit close to another unit. The environment 400 depicts a building 401 comprising a plurality of units that each comprise one or more rooms, and a plurality of wireless computing devices 404, 408, 412, 416, 420, 424, such as wireless routers. In some examples, the building 401 may comprise a plurality of individual rooms. In this example, a first unit 402 contains a first wireless computing device 404, a second unit 406 contains a second wireless computing device 408, a third unit 410 contains a third wireless computing device 412, a fourth unit 414 contains a fourth wireless computing device 416, a fifth unit 418 contains a fifth wireless computing device 420, and a sixth unit 422 contains a sixth wireless computing device 424. The first computing device 404 may have one or more wireless links with each of the second to sixth computing devices 408, 412, 416, 420, 424 in order to form a monitoring network for monitoring the movement of objects, including people, in unit 402.

In FIG. 4, as described above, the computing devices may be, for example, Wi-Fi-enabled APs. In this example, the first, second, third and fifth computing devices 404, 408, 412, 420 have a placement that may cause improper association of a movement, such as an activity, to a unit per the algorithm described above. For example, when a detectable movement of an object occurs in the first unit 402, which is close to the fifth unit 418, the system may infer based on a high rate of change in a CSI matrix as decoded at the fifth computing device 420, and a lower rate of change in a CSI matrix at the first computing device 404, that the movement is happening in the fifth unit 418. This may be due to the placement of the fifth computing device 420 in close proximity of the wall between the first and fifth units 402, 418. In some examples, this issue is more likely to be acute if the placement of computing devices, such as APs, is relatively sparse.

To help avoid a scenario where detectable movement of an object, or activity, is attributed to an incorrect unit, the system may also leverage additional computing devices that are connected to one of the plurality of computing devices 404, 408, 412, 416, 420, 424. For example, the plurality of computing devices may be Wi-Fi APs, and the additional computing devices may be one or more smartphones, laptops, tablets, IoT devices, and/or smart televisions that are attached to the Wi-Fi AP. Utilizing connected computing devices may enable a monitoring network to establish a more refined mapping of activity to, for example, an individual dwelling unit, derive the relative position of an access point within a dwelling unit, and eventually associate a detected event to a particular computing device, such as an AP.

In an example system, an association may be made between one or more client computing devices in a multiple dwelling unit, such as an apartment block, and an owner account. A client computing device may be a computing device, such as a smartphone, tablet, laptop, IoT device, and/or smart television that is wirelessly connected to an AP or router. In this example, the client computing devices may be identifiable using login information, a network SSID (if, for example, multiple networks are present) and/or an association to a basic service set identifier (BSSID) (for example, when multiple APs are be configured to be on the same network). The manner in which a client computing device is identified may depend on a networking solution in the multiple dwelling unit. In some examples, a location fingerprint may be created for a client computing device, which helps to identify whether the client computing device is stationary, i.e., being in the same area for a threshold amount of time. The location fingerprint may be determined by measuring average RSSI values of the wireless links of a client computing device to a plurality of APs, and/or, in a relatively granular approach, by measuring a CSI matrix associated with the wireless links that may be captured from one or more APs. In some examples, the location fingerprint may be calculated periodically rather than during a specific instance of activity.

Once the one or more client computing devices are associated with APs, and it is determined that the one or more client computing devices are in their normal location, the system may then create a set of these devices associated with a candidate unit within a building. On determining that an AP is associated with a detected movement, such as human activity, the AP may transmit a known sequence that is evaluated by the client computing devices in that unit, using a CSI matrix derived from a captured wireless signal. In some examples, a measure of time rate of change of the CSI is calculated, and when a client computing device in the unit reports a time rate of change measure above a certain threshold, the system may utilize this to validate that the detected movement is localized within that unit in the building. If no client computing device reports a measure being above a threshold, then another candidate unit from the building may be chosen, and the process may be re-run. With this approach, the system may determine a specific unit within a building in which movement of an object occurred. If there is ambiguity in discriminating a specific unit, as discussed in connection with FIG. 4 above, then by employing the client computing devices in one or more candidate units, the system may localize the activity to a specific unit within a building.

FIG. 5 is another flowchart of illustrative steps involved in enabling surveillance via one or more Wi-Fi networks, in accordance with some embodiments of the disclosure. Process 500 may be implemented, in whole or in part, on any of the aforementioned computing devices. In addition, one or more actions of the process 500 may be incorporated into or combined with one or more actions of any other processes or embodiments described herein.

At 502, a candidate $N_{Unit_x}$ is chosen from the set of units in a building in which movement, such as activity, was detected during a computing device-to-computing device, such as an AP-to-AP, pair-wise evaluation phase. At 504, a set of all client computing devices in the candidate unit is constructed, $N_{Unit_x} = \{Client_{1_x}, Client_{2_x} \ldots \}$. At step 506, detected activity on a wireless link from an $AP_x$ to each client $Client_{nx}$ is evaluated. At step 508, a measure of time rate of change of a CSI matrix for each client computing device is determined. At 510, it is determined whether a time rate of change measure for any one client computing device exceeds a threshold. If, at 510, it is determined that the time rate of change measure does exceed the threshold, then the process proceeds to step 512, where it is inferred that the movement is associated with that unit. If, at 510, it is determined that the time rate of change measure does not exceed the threshold, then the current unit candidate is rejected, and the process loops back to step 502 for a different unit in a building.

In some examples, a first computing device, such as a wireless router, that is part of a monitoring network may establish connections with each of a plurality of client computing devices over time. The first computing device may then derive a distribution map of the client devices attached to it based on a CSI matrix acquired over time. The distribution map may indicate relative locations of the client devices (or a subset of the client devices) and/or indicate static structures, such as walls. In some examples, the distribution map may indicate a range of locations associated with the client devices (or a subset of the client devices), and the distribution map may indicate a time associated with each location. In some examples, the distribution map may be a heat map, with different values assigned to each location based on, for example, an amount of time that each client device (each of a subset of client devices) spends at a location. The distribution map may be constructed, for example, by aggregating various CSI captures made at different times for different client computing devices. For example, a CSI print may be taken once a connection with a client computing device is first established, and/or the RSSI of that connection is at a peak. In some examples, the system may also detect a sudden increase in the rate of change in CSI, which is indicative of a client computing device moving behind and/or past a wall, thereby gaining or losing direct line of sight with the first computing device. In some examples, the system may also detect static client computing devices within a unit such as, for example, a smart television, a desktop computer and/or a smart home device, such as a connected light bulb. The system may determine whether a client computing device is static by detecting an unchanged connection state between that client computing device and the first computing device.

Referring back to FIG. 4, in an example, the first computing device 404 in the first unit 402 may connect to a plurality of client devices on a subscriber's own SSID; however, the computing device 404 may still extract CSI information for each of these connections over time. By analyzing an angle of arrival, the first computing device may determine that a relatively high concentration of connections arrive from the northeast quadrant with respect to the first computing device; however, the fifth computing device 420 may only detect client computing devices the northeast and southeast quadrants with respect to the fifth computing device 420. If an activity is detected and assigned to the fifth computing device 420 via the voting system as discussed in connection with Table 1, but if the first computing device 404 comes second in the voting, the system may further infer that the activity is more likely to be happening in the first unit 402 that is associated with the first computing device 404 than the fifth unit 418 that is associated with the fifth computing device 420. This system may infer this because, in this example, a disturbance may be measured between the first computing device 404 and the fifth computing device 420; however, the first computing device 404 is located southwest relative to the fifth router 420, and the fifth router 420 did not detect a client computing device connection in this quadrant.

In another example, a detection of an object movement, such as an activity, may be allocated to a number of computing devices. In this example, instead of electing only one computing device per the voting system discussed in connection with Table 1 above, the system may rank the computing devices in order of likelihood of a detected activity being associated with a particular computing device. The system may then proceed with instructing each computing device in the order of the ranking to attempt further measurement of CSI variations on wireless links that each computing device has established with one or more connected client computing devices. In an example, a unit, such as an apartment unit, is a convex space, and the computing devices and the connected clients' computing devices are located within that convex space. In this example, an object movement, such as an activity, within that convex space may create a relatively higher rate of change reflected in a CSI between that computing device and the connected client computing devices in the convex space, than when compared to a wireless link between a computing device and another computing device located outside of that convex space. In some examples, the system may then associate an event with a particular computing device with a lower false alarm rate using this disambiguation technique.

FIG. 6 is another flowchart of illustrative steps involved in enabling surveillance via one or more Wi-Fi networks, in accordance with some embodiments of the disclosure. Process 600 may be implemented, in whole or in part, on any of the aforementioned computing devices. In addition, one or more actions of the process 600 may be incorporated into or combined with one or more actions of any other processes or embodiments described herein.

At 602, a wireless link between first and second wireless devices is initiated. At 604, a first direction of the wireless link between the first wireless device and the second wireless devices is evaluated via first time rate-of-change data for the first direction, and at 606, a second direction of the wireless link between the first wireless device and the second wireless device is evaluated via second time rate-of-change data for the second direction. At 608, CSI of the wireless link is evaluated, utilizing the evaluations of the first and second direction of the wireless link, to determine relative locations of the first wireless device and the second wireless device. At 610, based at least in part on the evaluating the CSI of the wireless link, the first wireless device, the second wireless device, and the wireless link are selected to perform a monitoring routine. At 612, the first wireless device and the second wireless device are controlled to perform the monitoring routine to determine a relative position and a movement of an object, wherein performing the monitoring routine comprises evaluating third time rate-of-change data of the wireless link, and at 618, an indication of the movement and relative position of the object is generated for output.

Figure 7:
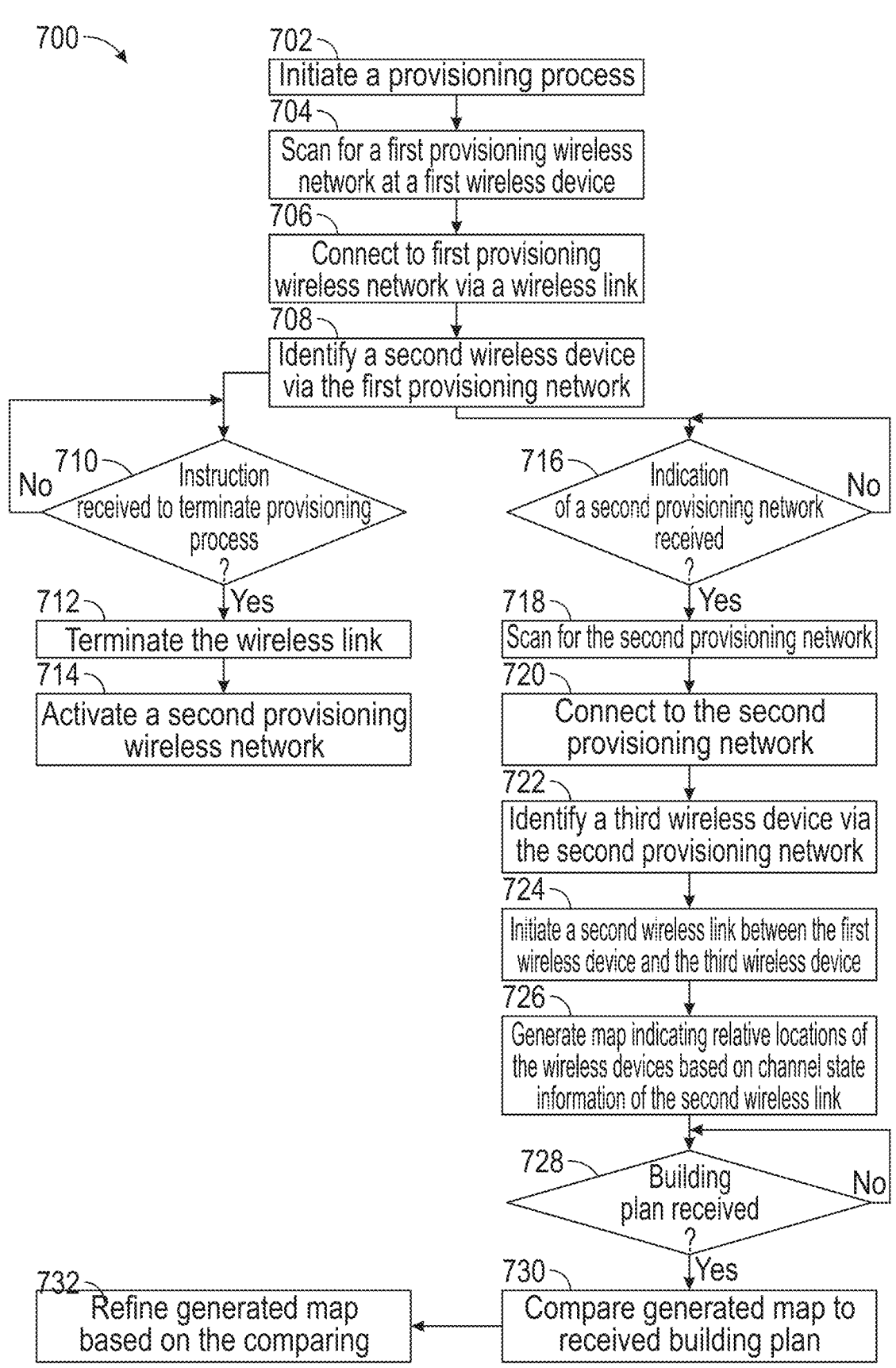
FIG. 7 is another flowchart of illustrative steps involved in enabling surveillance via one or more Wi-Fi networks, in accordance with some embodiments of the disclosure.

FIG. 7 is another flowchart of illustrative steps involved in enabling surveillance via one or more Wi-Fi networks, in accordance with some embodiments of the disclosure. Process 700 may be implemented, in whole or in part, on any of the aforementioned computing devices. In addition, one or more actions of the process 700 may be incorporated into or combined with one or more actions of any other processes or embodiments described herein.

At 702, a provisioning process is initiated, and at 704, a first provisioning network is scanned for at a first wireless device. At 706, a first provisioning network is connected to via a wireless link, and at 708 a second wireless device is identified via the first provisioning network. From 708, the process proceeds to step 710 and to step 716.

At step 710, it is determined whether an instruction to terminate the provisioning process has been received. If the instruction to terminate the provisioning process has not been received, then the process loops around. If an instruction to terminate the provisioning process has been received, then the process proceeds to step 712, where the wireless link is terminated. At step 714, a second provisioning wireless network is activated.

At 716, it is determined whether an indication of a second provisioning network has been received. If the indication of a second provisioning network has not been received, then the process loops around. If the indication of a second provisioning network has been received, then the process proceeds to step 718, where the second provisioning network is scanned for. At step 720, the first wireless device connects to the second provisioning network, and at step 722, a third wireless device is identified via the second provisioning network. At step 724, a second wireless link between the first and third wireless devices is initiated, and at step 726, a map indicating relative locations of the wireless devices is generated based on channel state information of the second wireless link.

At step 728, it is determined whether a building plan has been received. If, at step 728, it is determined that the building plan has not been received, then the process loops around. If, at step 728, it is determined that the building plan has been received, then the process proceeds to step 730, where the generated map is compared to the received building plan. At step 732, the generated map is refined based on the comparing.

Figure 8:
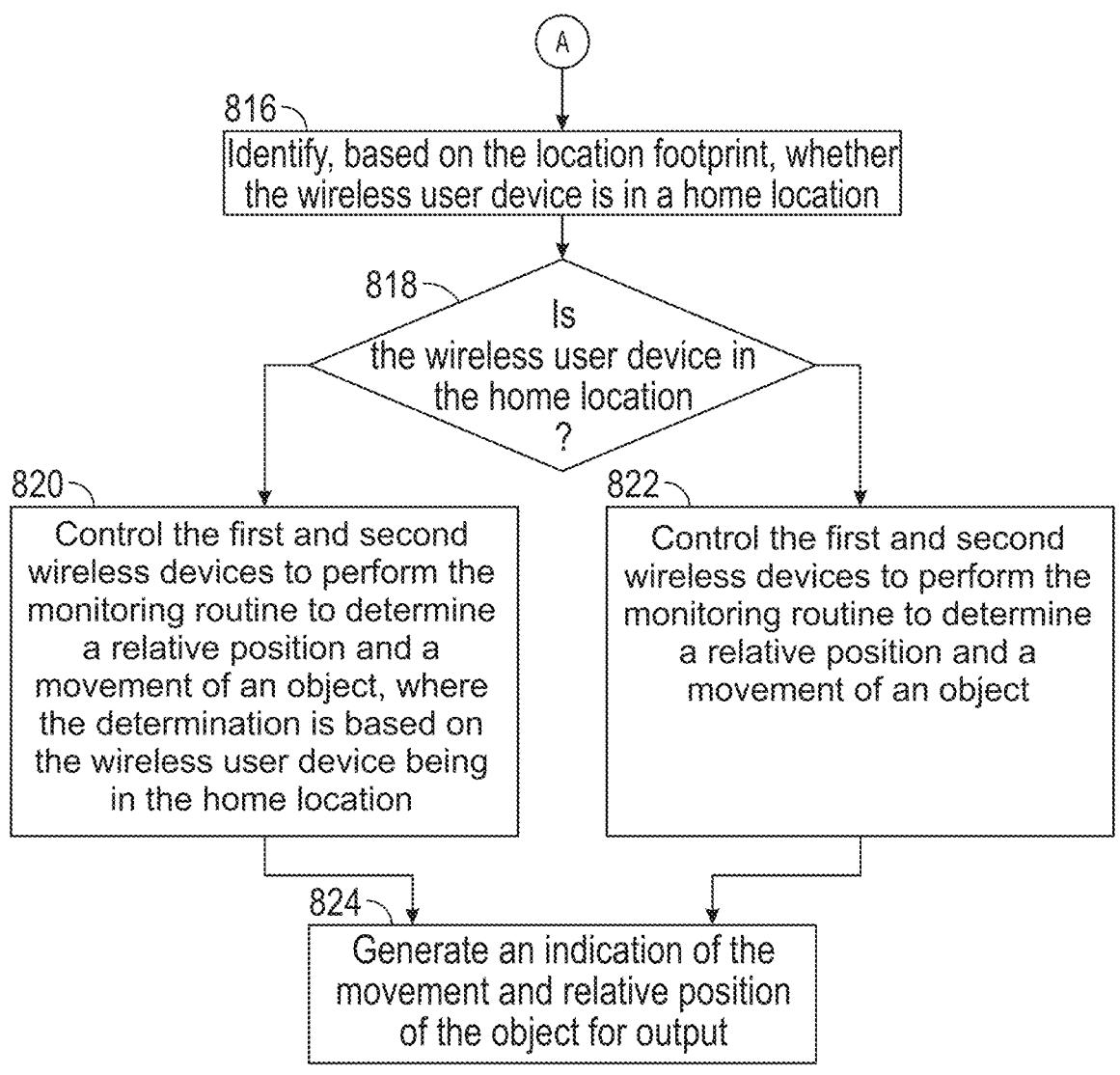
FIG. 8 is another flowchart of illustrative steps involved in enabling surveillance via one or more Wi-Fi networks, in accordance with some embodiments of the disclosure.

FIG. 8 is another flowchart of illustrative steps involved in enabling surveillance via one or more Wi-Fi networks, in accordance with some embodiments of the disclosure. Process 800 may be implemented, in whole or in part, on any of the aforementioned computing devices. In addition, one or more actions of the process 800 may be incorporated into or combined with one or more actions of any other processes or embodiments described herein.

At 802, a wireless link between first and second wireless devices is initiated via a first radio. At 804, a first direction of the wireless link between the first wireless device and the second wireless devices is evaluated via first time rate-of-change data for the first direction, and at 806, a second direction of the wireless link between the first wireless device and the second wireless device is evaluated via second time rate-of-change data for the second direction. At 808, CSI of the wireless link is evaluated, utilizing the evaluations of the first and second direction of the wireless link, to determine relative locations of the first wireless device and the second wireless device. At 810, based at least in part on the evaluating the CSI of the wireless link, the first wireless device, the second wireless device, and the wireless link are selected to perform a monitoring routine.

At 812, the first wireless router is configured to communicate with a wireless user device via a second radio, and at step 814, a location footprint is generated for the wireless user device. At step 816, it is identified whether the wireless user device is in a home location based on the location footprint, and at step 818, it is determined whether the wireless user device is in the home location. If, at step 818, it is determined that the wireless device is in the home location, then the process proceeds to step 820, where the first wireless device and the second wireless device are controlled to perform the monitoring routine to determine a relative position and a movement of an object, wherein performing the monitoring routine comprises evaluating third time rate-of-change data of the wireless link and determining that the wireless device is in the home location. The process then proceeds to step 824. If, at step 818, it is determined that the wireless device is not in the home location, then the process proceeds to step 822, where the first wireless device and the second wireless device are controlled to perform the monitoring routine to determine a relative position and a movement of an object, wherein performing the monitoring routine comprises evaluating third time rate-of-change data of the wireless link. The process then proceeds to step 824. At step 824, an indication of the movement and relative position of the object is generated for output.

Figure 9:
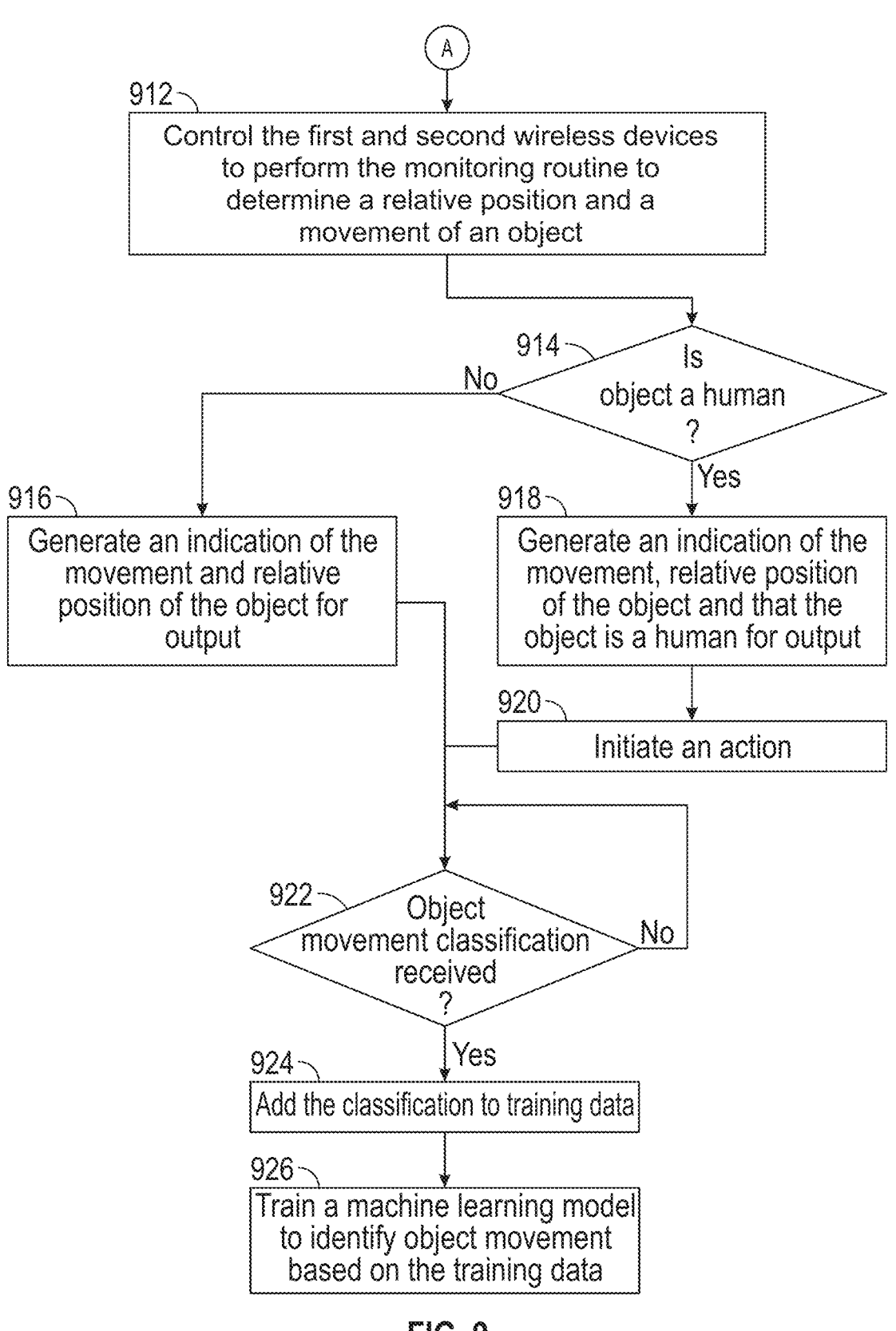
FIG. 9 is another flowchart of illustrative steps involved in enabling surveillance via one or more Wi-Fi networks, in accordance with some embodiments of the disclosure.

FIG. 9 is another flowchart of illustrative steps involved in enabling surveillance via one or more Wi-Fi networks, in accordance with some embodiments of the disclosure. Process 900 may be implemented, in whole or in part, on any of the aforementioned computing devices. In addition, one or more actions of the process 900 may be incorporated into or combined with one or more actions of any other processes or embodiments described herein.

At 902, a wireless link between first and second wireless devices is initiated. At 904, a first direction of the wireless link between the first wireless device and the second wireless devices is evaluated via first time rate-of-change data for the first direction, and at 906, a second direction of the wireless link between the first wireless device and the second wireless device is evaluated via second time rate-of-change data for the second direction. At 908, CSI of the wireless link is evaluated, utilizing the evaluations of the first and second direction of the wireless link, to determine relative locations of the first wireless device and the second wireless device. At 910, based at least in part on the evaluating the CSI of the wireless link, the first wireless device, the second wireless device, and the wireless link are selected to perform a monitoring routine. At 912, the first wireless device and the second wireless device are controlled to perform the monitoring routine to determine a relative position and a movement of an object, wherein performing the monitoring routine comprises evaluating third time rate-of-change data of the wireless link.

At step 914, if it is determined whether the object is a human. If, at 914, it is determined that the object is not a human, then the process proceeds to step 916, where an indication of the movement and relative position of the object is generated for output. The process then proceeds to step 922. At step 914, if it determined that the object is a human, then the process proceeds to step 918, where an indication of the movement, relative position of the object and that the object is a human is generated for output, and at step 920, an action is initiated. The process then proceeds to step 922.

At step 922, it is determined whether an object classification has been received. If, at step 922, an object classification has not been received, then the process loops back around. If, at step 922, an object classification has been received, then the process proceeds to step 924, where the object and the associated classification are added to a training data set. At step 926, a machine learning model is trained to identify object movement based on the training data.

Figure 10:
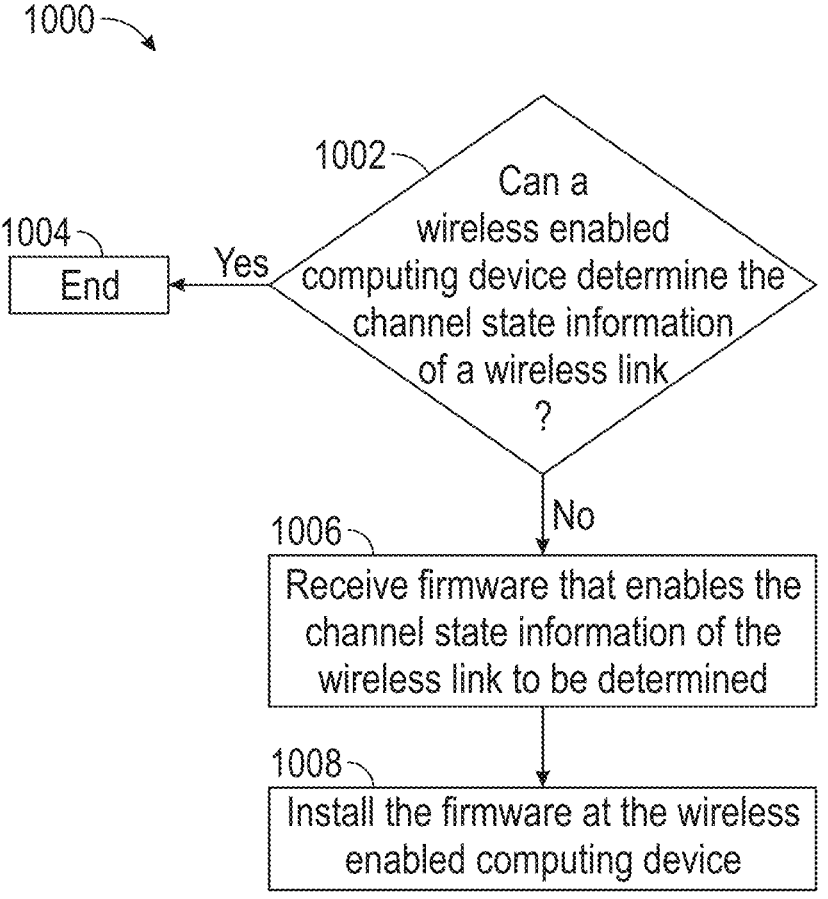
FIG. 10 is another flowchart of illustrative steps involved in enabling surveillance via one or more Wi-Fi networks, in accordance with some embodiments of the disclosure.

FIG. 10 is another flowchart of illustrative steps involved in enabling surveillance via one or more Wi-Fi networks, in accordance with some embodiments of the disclosure. Process 1000 may be implemented, in whole or in part, on any of the aforementioned computing devices. In addition, one or more actions of the process 1000 may be incorporated into or combined with one or more actions of any other processes or embodiments described herein. Process 1000 is an example process for updating the firmware of a computing device comprising a radio, such as a radio that enables the computing device to connect to and/or to transmit a Wi-Fi network, so that it may determine CSI information.

At 1002, it is determined whether a wireless enabled computing device can determine the CSI of a wireless link. If, at step 1002, it is determined that the wireless computing device can determine the CSI of a wireless link, then the process proceeds to step 1004 where it ends. If, at step 1002, it is determined that the wireless enabled computing device cannot determine the CSI of a wireless link, then the process proceeds to step 1006, where the wireless enabled computing device receives firmware that enables the CSI of a wireless link to be determined. At step 1008, the received firmware is installed at the wireless enabled computing device.

Figure 11:
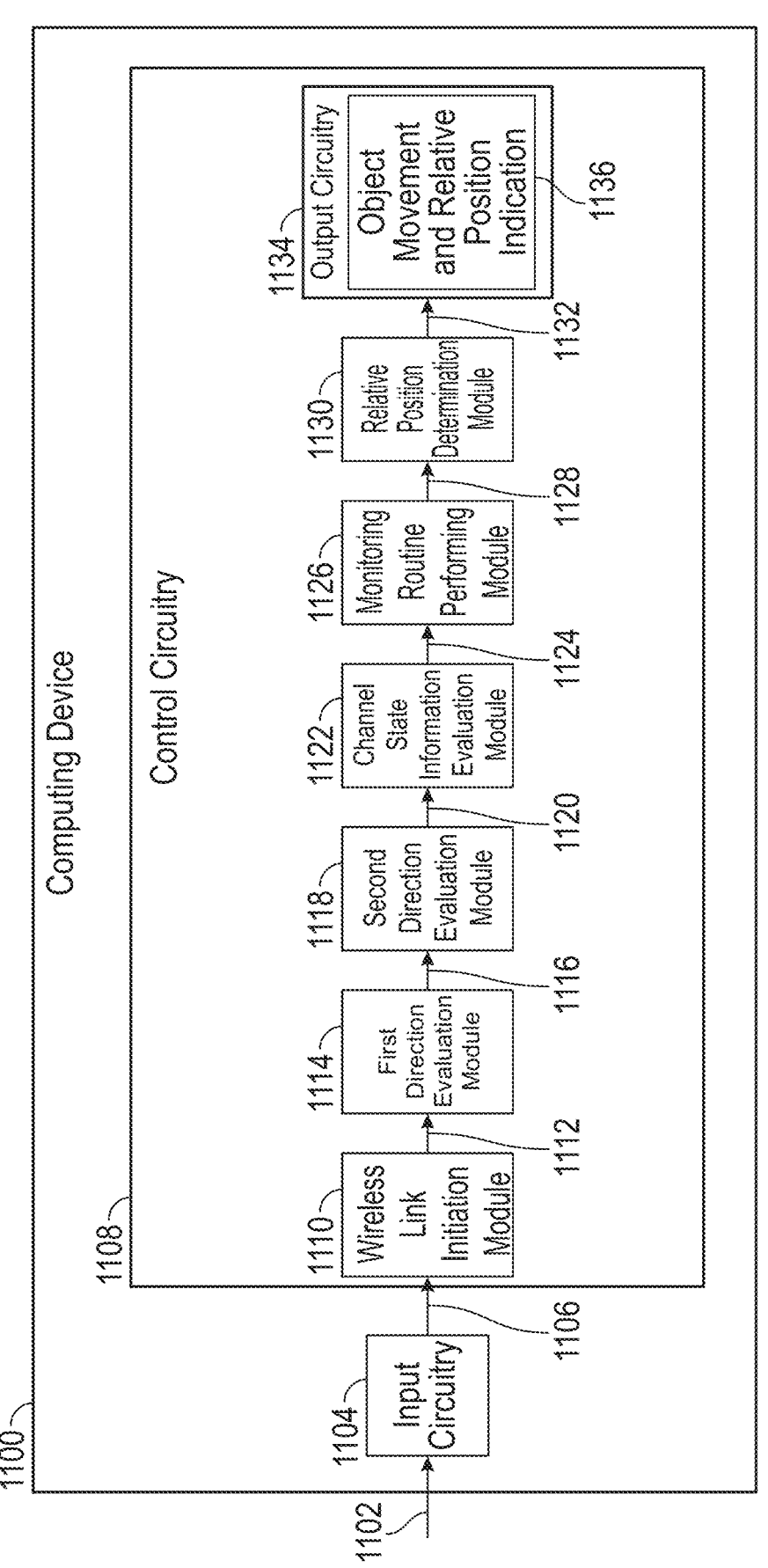
FIG. 11 shows a block diagram representing components of a computing device and dataflow therebetween for enabling surveillance via one or more Wi-Fi networks, in accordance with some embodiments of the disclosure.

FIG. 11 shows a block diagram representing components of a computing device and dataflow therebetween for enabling surveillance via one or more Wi-Fi networks, in accordance with some embodiments of the disclosure. Computing device 1100 comprises input circuitry 1104, control circuitry 1108 and output circuitry 1134. The computing device 1100 may be, for example, a router, an AP, a smartphone, a tablet and/or a smart television. Control circuitry 1108 may be based on any suitable processing circuitry and comprises control circuits and memory circuits, which may be disposed on a single integrated circuit or may be discrete components and processing circuitry. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i9 processors) or multiple different processors (e.g., an Intel Core i5 processor and an Intel Core i7 processor) and/or a system on a chip (e.g., a Qualcomm Snapdragon 888). Some control circuits may be implemented in hardware, firmware, or software.

First input is received 1102 by the input circuitry 1104. The input circuitry 1104 is configured to receive inputs related to a computing device. For example, this may comprise instructions received via another computing device. The input circuitry 1104 transmits 1106 the user input to the control circuitry 1108.

The control circuitry 1108 comprises a wireless link initiation module 1110, a first direction evaluation module 1114, a second direction evaluation module 1118, a CSI evaluation module 1122, a monitoring routine performing module 1126, a relative position determination module 1130 and an output circuitry module 1134 comprising an object movement and relative position indication module 1136. The first input is transmitted 1106 to the wireless link initiation module 1110, where a wireless link is initiation between a first wireless device and a second wireless device. An indication that the link is initiated is transmitted 1112 to the first direction evaluation module 1114, where a first direction of the wireless link between the first wireless device and the second wireless devices is evaluated via first time rate-of-change data for the first direction. The evaluation of the first direction of the wireless link is transmitted 1116 to the second direction evaluation module 1118, where a second direction of the wireless link between the first wireless device and the second wireless device is evaluated via second time rate-of-change data for the second direction. The evaluation of the first and second directions of the wireless link is transmitted 1120 to the CSI evaluation module 1122, where CSI of the wireless link is evaluated, based on the evaluations of the first and second directions, to determine relative locations of the first wireless device and the second wireless device. The evaluation of the CSI of the wireless link is transmitted 1124 to the monitoring routine performing module 1126, where, based at least in part on the evaluating the CSI of the wireless link, selecting the first wireless device, the second wireless device, and the wireless link to perform a monitoring routine. An indication of the selected devices is transmitted 1128 to the relative position determination module 1130, where the first wireless device and the second wireless device are controlled to perform the monitoring routine to determine a relative position and a movement of an object, wherein performing the monitoring routine includes evaluating third time rateof-change data of the wireless link. An indication of the relative position and the movement of the object is transmitted 1132 to the output circuitry module 1134 comprising an object movement and relative position indication module 1136, where an indication of the movement and relative position of the object is generated for output.

In another example, an environment may comprise a parking lot comprising a plurality of vehicles, with at least a subset of the vehicles in the parking lot containing a wireless computing device, such as a vehicle-to-everything (V2X) wireless device. In a manner similar to that described herein with respect to a building comprising a plurality of units, the vehicle wireless computing devices may be configured to enable the monitoring and/or detection of moving objects, including people, in the parking lot. Rather than an ISP configuring the wireless devices, the wireless devices may be configured via a standard communication system that the vehicles use to communicate with one another. An example of such a communication system is a V2X communication system.

A wireless link may be initiated between a first wireless device, located in a first car, and a second wireless device, located in a second car. CSI of the wireless link may be evaluated to determine relative locations of the first and second wireless devices. This evaluation may comprise evaluating the wireless link in a first direction between the first wireless device and the second wireless device via first time rate-of-change data for the first direction, and evaluating the wireless link in a second direction between the first wireless device and the second wireless device via second time rate-of-change data for the second direction. The first and second wireless devices and the wireless link may be selected based at least in part on evaluation the CSI of the wireless link. The first and second wireless devices may be controlled to perform the monitoring routine to determine a relative position and movement of an object, including, for example, a person, wherein the performing the monitoring routine may comprise evaluating third time rate-of-change data of the wireless link. An indication of the movement and relative position of the object may be generated for output. In this manner, wireless surveillance of the parking lot, such as surveillance performed via one or more Wi-Fi networks, is enabled.

In some examples, a user interface may be presented via a display associated with a vehicle. This user interface may comprise one or more input elements for enabling or disabling participation in the wireless monitoring as described herein. In some examples, the output indicating the movement and relative position of the object may comprise transmitting a data, including, for example, a message, to a control center, for example, a control center associated with a vehicle manufacturer. In other examples, the output may comprise transmitting data, including, for example, a message, to another computing device, such as a smartphone. In some examples, the output may comprise turning on one or more exterior and/or interior lights of the vehicle and/or causing the vehicle to make a sound, such as sounding the vehicle horn and/or alarm system.

The processes described above are intended to be illustrative and not limiting. One skilled in the art would appreciate that the steps of the processes discussed herein may be omitted, modified, combined, and/or rearranged, and any additional steps may be performed without departing from the scope of the disclosure. More generally, the above disclosure is meant to be illustrative and not limiting. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

initiating a wireless link between a first wireless device and a second wireless device;

evaluating channel state information (CSI) of the wireless link to determine relative locations of the first wireless device and the second wireless device, wherein the evaluating the CSI comprises:

evaluating a first direction of the wireless link between the first wireless device and the second wireless devices via first time rate-of-change data for the first direction; and evaluating a second direction of the wireless link between the first wireless device and the second wireless device via second time rate-of-change data for the second direction;

based at least in part on the evaluating the CSI of the wireless link, selecting the first wireless device, the second wireless device, and the wireless link to perform a monitoring routine;

controlling the first wireless device and the second wireless device to perform the monitoring routine to determine a relative position and a movement of an object, wherein performing the monitoring routine comprises evaluating third time rate-of-change data of the wireless link; and generating, for output, an indication of the movement and relative position of the object.

2. The method of claim 1, wherein the wireless link is a first wireless link and identifying the second wireless device further comprises:

initiating, at the first wireless device, a provisioning process;

scanning, at the first wireless device, for a first provisioning wireless network;

connecting to the first provisioning network via a second wireless link; and identifying the second wireless device via the first provisioning network.

3. The method of claim 2, wherein the method further comprises:

receiving, at the first wireless device, an instruction to terminate the provisioning process;

terminating, at the first wireless device, the second wireless link; and activating, at the first wireless device, a second provisioning wireless network, wherein the second provisioning wireless network comprises a connection between the first wireless device and a third wireless device.

4. The method of claim 2, wherein the CSI is first CSI and the method further comprises:

receiving, at the first wireless device and from the second wireless device, an indication of a second provisioning network;

scanning, at the first wireless device, for the second provisioning wireless network;

connecting to the second provisioning network;

identifying a third wireless device via the second provisioning network;

initiating a third wireless link between the first wireless device and the third wireless device; and wherein the generating the data indicating the relative locations of the first wireless device and the second wireless device further comprises generating, via second CSI of the second wireless link, the data indicating the relative locations of the first wireless device, the second wireless device and the third wireless device.

5. The method of claim 4, wherein the method further comprises:

receiving a plan of a building associated with the first wireless device;

comparing the data indicating relative locations of the first wireless device and the second wireless device to the received plan; and refining, based on the comparing, the data indicating relative locations of the first wireless device and the second wireless device.

6. The method of claim 1, wherein:

the first wireless device and the second wireless devices are routers; the first wireless device comprises a first radio and a second radio; and the method further comprises enabling:

the first wireless device and the second wireless device to communicate via the first radio; and the first wireless device to communicate with a wireless user device via the second radio.

7. The method of claim 1, wherein the first wireless device and the second wireless devices are routers and the method further comprises:

connecting, to the first wireless device, a wireless user device;

generating a location fingerprint for the wireless user device;

identifying, based on the location fingerprint, a home location associated with the wireless user device;

identifying that the wireless user device is in the home location; and determining the relative position of the object with respect to the first wireless device and the second wireless device further comprises identifying that the object is in the home location.

8. The method of claim 1, wherein the method further comprises:

receiving input classifying the movement of the object;

adding the classification to training data; and training, based on the training data, a machine learning model to identify object movement.

9. The method of claim 1, wherein:

the method further comprises determining, via the CSI of the wireless link, that the object is a human;

generating the indication of the movement and relative position of the object further comprises indicating that the object is a human; and the method further comprises initiating an action at a computing device.

10. The method of claim 1, wherein the method further comprises:

identifying that the first wireless device cannot determine the CSI of the wireless link;

receiving, at the first wireless device, firmware that enables the CSI of the wireless link to be determined; and installing, at the first wireless device, the received firmware.

11. A system comprising:

input/output circuitry configured to:

initiate a wireless link between the first wireless device and the second wireless device;

processing circuitry configured to:

evaluate CSI of the wireless link to determine relative locations of the first wireless device and the second wireless device, wherein the processing circuitry configured to evaluate the CSI of the wireless link is further configured to:

evaluate a first direction of the wireless link between the first wireless device and the second wireless devices via first time rate-of-change data for the first direction; and evaluate a second direction of the wireless link between the first wireless device and the second wireless device via second time rate-of-change data for the second direction;

based at least in part on the evaluating the CSI of the wireless link, select the first wireless device, the second wireless device, and the wireless link to perform a monitoring routine;

control the first wireless device and the second wireless device to perform the monitoring routine to determine a relative position and a movement of an object, wherein performing the monitoring routine comprises evaluating third time rate-of-change data of the wireless link; and generate, for output, an indication of the movement and relative position of the object.

12. The processing circuitry of claim 11, wherein the wireless link is a first wireless link and the processing circuitry configured to identify the second wireless device further comprises processing circuitry configured to:

initiate, at the first wireless device, a provisioning process;

scan, at the first wireless device, for a first provisioning wireless network;

connect to the first provisioning network via a second wireless link; and identify the second wireless device via the first provisioning network.

13. The processing circuitry of claim 12, wherein the processing circuitry is further configured to:

receive, at the first wireless device, an instruction to terminate the provisioning process;

terminate, at the first wireless device, the second wireless link; and activate, at the first wireless device, a second provisioning wireless network, wherein the second provisioning wireless network comprises a connection between the first wireless device and a third wireless device.

14. The processing circuitry of claim 12, wherein the CSI is first CSI and the processing circuitry is further configured to:

receive, at the first wireless device and from the second wireless device, an indication of a second provisioning network;

scan, at the first wireless device, for the second provisioning wireless network;

connect to the second provisioning network;

identify a third wireless device via the second provisioning network;

initiate a third wireless link between the first wireless device and the third wireless device; and wherein the processing circuitry configured to generate the data indicating the relative locations of the first wireless device and the second wireless device is further configured to generate, via second CSI of the second wireless link, the data indicating the relative locations of the first wireless device, the second wireless device and the third wireless device.

15. The processing circuitry of claim 14, wherein the processing circuitry is further configured to:

receive a plan of a building associated with the first wireless device;

compare the data indicating relative locations of the first wireless device and the second wireless device to the received plan; and refine, based on the comparing, the data indicating relative locations of the first wireless device and the second wireless device.

16. The processing circuitry of claim 11, wherein:

the first wireless device and the second wireless devices are routers; the first wireless device comprises a first radio and a second radio; and the processing circuitry is further configured to enable:

the first wireless device and the second wireless device to communicate via the first radio; and the first wireless device to communicate with a wireless user device via the second radio.

17. The processing circuitry of claim 11, wherein the first wireless device and the second wireless devices are routers and the processing circuitry is further configured to:

connect, to the first wireless device, a wireless user device;

generate a location fingerprint for the wireless user device;

identify, based on the location fingerprint, a home location associated with the wireless user device;

identify that the wireless user device is in the home location; and determine the relative position of the object with respect to the first wireless device and the second wireless device further comprises identifying that the object is in the home location.

18. The processing circuitry of claim 11, wherein the processing circuitry is further configured to:

receive input classifying the movement of the object;

add the classification to training data; and train, based on the training data, a machine learning model to identify object movement.

19. The processing circuitry of claim 11, wherein:

the processing circuitry is further configured to determine, via the CSI of the wireless link, that the object is a human;

the processing circuitry configured to generate the indication of the movement and relative position of the object is further configured to indicate that the object is a human; and the processing circuitry is further configured to initiate an action at a computing device.

20. The processing circuitry of claim 11, wherein the processing circuitry is further configured to:

identify that the first wireless device cannot determine the CSI of the wireless link;

receive, at the first wireless device, firmware that enables the CSI of the wireless link to be determined; and install, at the first wireless device, the received firmware.

* * * * *